United States Patent [19]

Buhl

[11] Patent Number: 4,790,681
[45] Date of Patent: Dec. 13, 1988

[54] HOLDING RING FOR SEAL BELLOWS ON TRACK RODS OF MOTOR VEHICLES

[75] Inventor: Reinhard Buhl, Bohmte, Fed. Rep. of Germany

[73] Assignee: Lemförder Metallwaren AG, Fed. Rep. of Germany

[21] Appl. No.: 93,578

[22] Filed: Sep. 4, 1987

[30] Foreign Application Priority Data

Sep. 5, 1986 [DE] Fed. Rep. of Germany ....... 3630337

[51] Int. Cl.[4] ............................................. F16C 11/00
[52] U.S. Cl. ..................................... 403/134; 403/51; 74/18.1
[58] Field of Search ........................... 403/50, 51, 134; 74/18.1; 277/212 FB

[56] References Cited

U.S. PATENT DOCUMENTS 1,167,695 1/1916 Huff .................................. 403/51 X

FOREIGN PATENT DOCUMENTS 1000622 8/1965 United Kingdom ................ 403/134

Primary Examiner—Andrew V. Kundrat
Attorney, Agent, or Firm—McGlew and Tuttle

[57] ABSTRACT

The invention relates to a holding ring for seal bellows on a track rod or shank of a universal pivot member of motor vehicles. The ring comprises a rubber or another material having comparable properties, and, secured against axial displacement, but rotatably mounted on the track rod. The holding ring is, at least on a surface area in contact with the track rod, supplied with a hardened, smoothed molecular structure. This alteration of the molecular structure is achieved preferentially by chlorination.

4 Claims, 1 Drawing Sheet

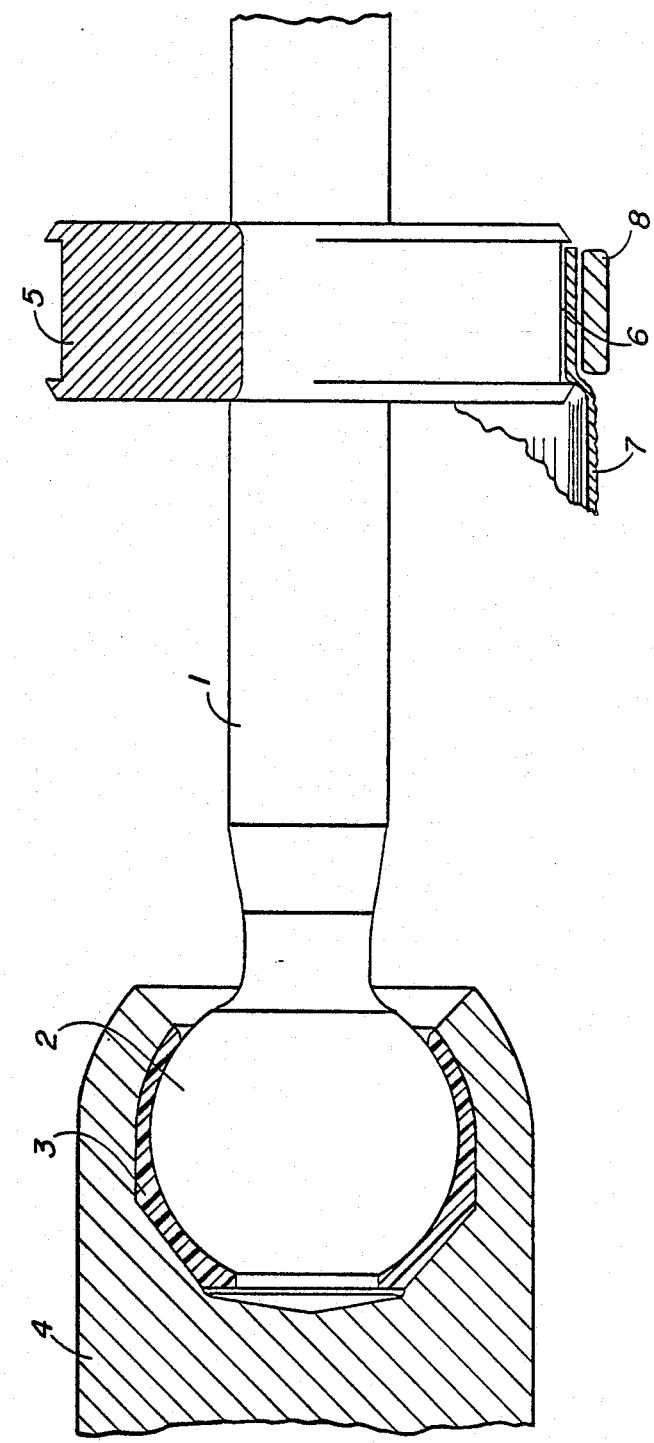

HOLDING RING FOR SEAL BELLOWS ON TRACK RODS OF MOTOR VEHICLES

BACKGROUND OF THE INVENTION

1. Field of the Invention

This invention relates, in general, to the universal joint members or track rods which have shank portions with an annular recess spaced away from a ball portion which contains a holding ring for a bellows, the ring being secured against axial displacement, but being rotatable on the shank portion and having a hardened, smooth molecular structure of its contacting surface with the track member.

Such holding rings are penetrated by the track rod and secured against axial displacements by encircling recesses and projections which interengage. Fastening of the seal bellows takes place by a spring ring in a peripheral groove of the holding ring. When adjusting the length of track rods the latter rod is twisted relative to the bellows. The danger then exists of twisting the bellows since the holding ring can only be rotated on the track rod by applying force. Such twisted bellows, however, cannot be expected to function fully. The situation is remedied according to the state of the art in that the holding ring is slid onto the track rod under minimal prestress or with special grease, which is applied between the contacting surfaces of the holding ring and the track rod, and the link pin of the socket joint, which is to be protected by the bellows, in order to decrease friction between two parts, by a combination of these two measures. The special grease, however, must not under any circumstances, come into contact with the special grease of the steering rack of the steering mechanisms. The arrangement with low prestress makes high demands on the dimensional accuracy and increases production expenses accordingly.

SUMMARY OF THE INVENTION

The invention provides a construction in which the fit of the holding ring on the track rod provides a low degree of friction while maintaining its effective sealing capacity.

In accordance with the invention, a holding ring for a seal bellows of a track rod of a motor vehicles comprises an elastic material ring rotatably mounted on the track rod, but held against displacement and which has a contact surface in contact with the rod which has a hardened, smooth molecular structure.

The harder and smoother molecular structure of the holding ring surface, at least in the areas contacting the track rod compared to the remaining molecular structure, reduces the friction coefficient between the two parts considerably, so that the holding ring without loosing its sealing capacity and without using a special grease can readily be rotated on the track rod. The forces required for rotation are significantly smaller than the material stresses which build up when the sealing ring is twisted, so that the bellows is at all times free of material stresses, moreover, cannot build up unnoticed when adjusting the track rod.

In one embodiment, the alteration of the surface structure of the ring by chlorination is particularly simple to carry out and has the greatest possible effect as experiments have shown. For reasons of cost-effectiveness, the chlorination can take place over the entire surface of the ring, because this step has no noticeable effect on the elasticity of the holding ring. By varying the length of exposure time, in the simplest possible form done by submersion in a liquid substance, the resulting degree of hardness on the surface of the holding ring can be varied.

Accordingly, it is an object of the invention to provided an improved construction for holding a seal bellows in position over a track rod or link pin of a universal joint which includes a holding ring which is mounted in an annular recess of the link pin so that it can rotate, but not be axially displaced and which includes a surface which is in contact with the link pin and has a hardened, smooth, molecular structure.

A further object of the invention is to provide a construction for holding a seal bellows on a link pin which is simple in design, rugged in construction and economical to manufacture.

The various features of novelty which characterize the invention are pointed with particularity in the claims anexed to and forming a part of this disclosure. For a better understanding of the the invention its operating advantages and specific objects obtained by its uses, reference is made to the accompanying drawings and descriptive matter in which a prefered embodiment of the invention is illustrated.

BRIEF DESCRIPTION OF THE DRAWINGS

In the Drawings:

The only FIGURE of the drawings is a partial elevational and partial sectional view of a universal joint link pin having a holding ring for mounting a seal bellows constructed in accordance with the invention.

GENERAL DESCRIPTION OF THE PREFERRED EMBODIMENTS

Referring to the drawings, in particular, the invention embodied therein comprises a ball and socket joint with a ball joint 2 fastened at the end of a link pin 1, which is supported by a ball joint receiving socket 3 of synthetic material in a casing 4. On the universal joint member or link pin 1, the holding ring 5 is arranged axially non-displaceably. The constructive means employed to hold a bellows 7 on the ring 5 are not shown in complete detail in the drawing but a bellows 7 is fastened in a peripheral recess 6 of the ring 5 with a spring 8 or similar member overlying it. At least the surface of the inner recess of the holding ring 5 in contact with the link pin has a molecular structure hardened compared to the remaining molecular structure of the ring and is smoothed through this process. The alteration of the molecular structure is achieved according to the invention through chlorination. To this end, the holding ring 5 can be submerged in a substance suitable for chlorination and remain in this substance for a given length of time until the desired degree of hardness and the desired degree of smoothness on the surface of the holding ring is attained. In this process of putting into practice the inventive concept, the entire surface of the holding ring is chlorinated, however, this is without noticeable effect on the elasticity of the holding ring 5. The desired effect according to the invention can, however, also be achieved in accordance with the invention in other ways, for example, through spraying, temporary coating or in other ways.

While a specific embodiment of the invention has been shown and described in detail to illustrate the application of the principals of the invention, it will be understood that the invention may be embodied otherwise without departing from such principals

What is claimed is;

1. A holding ring for seal bellows of a track rod of a motor vehicle comprising a track rod, a ring of elastic material having an interior contact surface with an altered molecular structure and secured against axial displacement on said track rod, but being rotatable relative to said track rod, said track rod having a track rod surface in contact with said interior contact surface of said holding ring which has a hardened, smooth, molecular structure.

2. A holding ring according to claim 1, wherein said interior contact surface of said holding ring is hardened by chlorination.

3. A seal bellows mounting for a universal joint, including a link pin having a ball head which is pivotally mounted and a shank portion having an annular recess, a holding ring of elastic material having an interior surface with an altered molecular structure rotatably supported on the recess of said shank portion wherein the surface of said ring has a hardened, smooth molecular structure.

4. A mounting arrangement, according to claim 3, wherein said holding ring includes an exterior annular surface with a bellows-receiving recess.

* * * * *